C. H. SCOTT, DEC'D.
B. SCOTT, EXECUTRIX.
SCALE.
APPLICATION FILED JULY 20, 1912.

1,156,500.

Patented Oct. 12, 1915.
2 SHEETS—SHEET 1.

WITNESSES

INVENTOR
CHARLES H. SCOTT
BY
ATTORNEYS

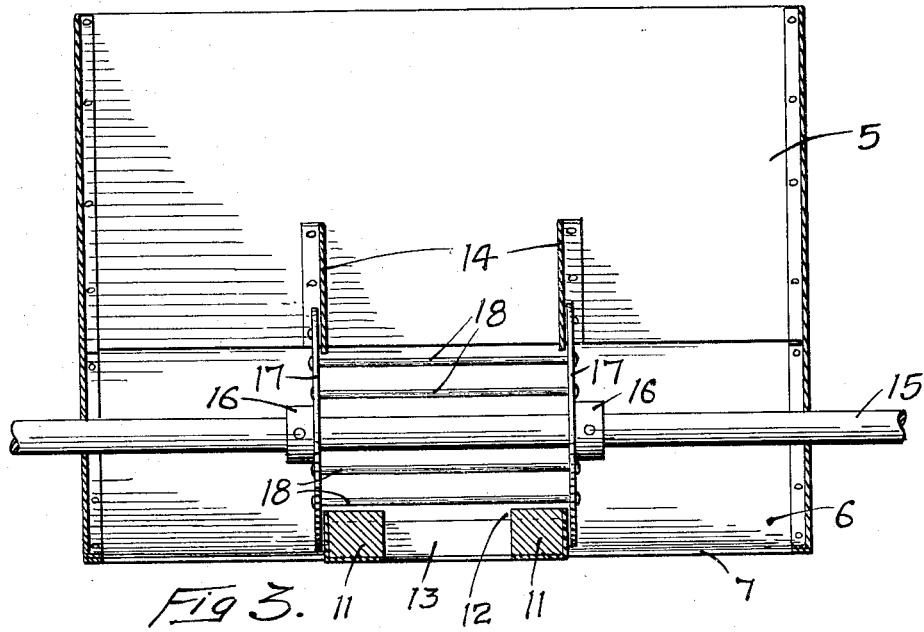
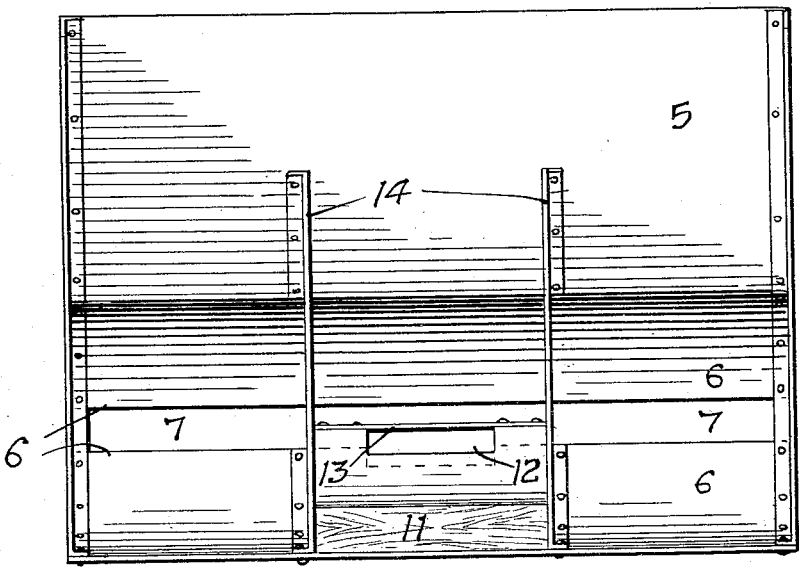

UNITED STATES PATENT OFFICE.

CHARLES H. SCOTT, OF MINNEAPOLIS, MINNESOTA; BLANCHE SCOTT EXECUTRIX OF SAID CHARLES H. SCOTT, DECEASED.

SCALE.

1,156,500.  Specification of Letters Patent.  Patented Oct. 12, 1915.

Application filed July 20, 1912. Serial No. 710,706.

*To all whom it may concern:*

Be it known that I, CHARLES H. SCOTT, of Minneapolis, Hennepin county, Minnesota, have invented certain new and useful Improvements in Scales, of which the following is a specification.

My invention relates to scales and particularly to that type used for weighing flour or similar fine material. In scales of this type as ordinarily constructed, a cut off is provided in connection with the scale pan so that when a certain amount of flour has been delivered to the pan and the beam tilts under the weight of the load, the flow of the flour from the hopper into the pan will be automatically cut off and in connection with the hopper outlet, a dribble opening, so called, is provided, which will permit the discharge of a small quantity of flour, sufficient to balance the beam. It has been found in connection with this dribble opening that the flour will sometimes arch or bridge in the hopper and prevent the flow through this opening at the time when it should allow a limited discharge.

The object, therefore, of my invention is to provide means in connection with this dribble opening which will positively discharge a small quantity of flour, sufficient to complete the weight, with each and every tilting of the beam, thus insuring great accuracy in weighing and a uniform delivery of flour.

Other objects of the invention will appear from the following detailed description.

The invention consists generally in various constructions and combinations, all as hereinafter described and particularly pointed out in the claims.

Figure 1:
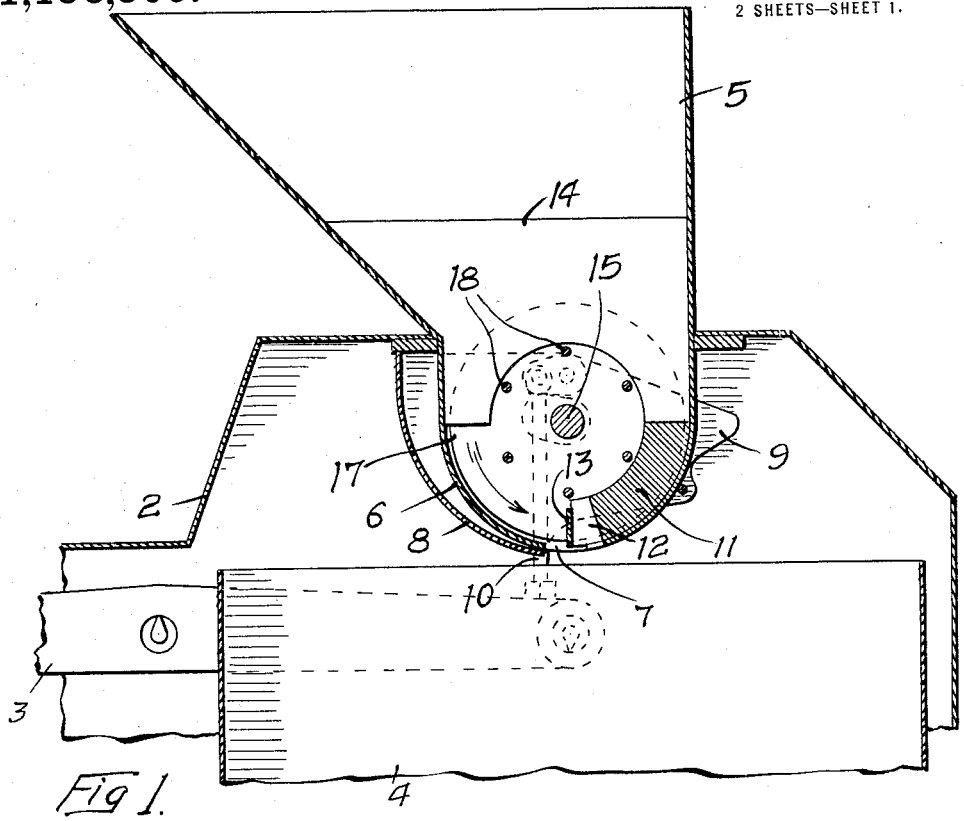
Figure 2:
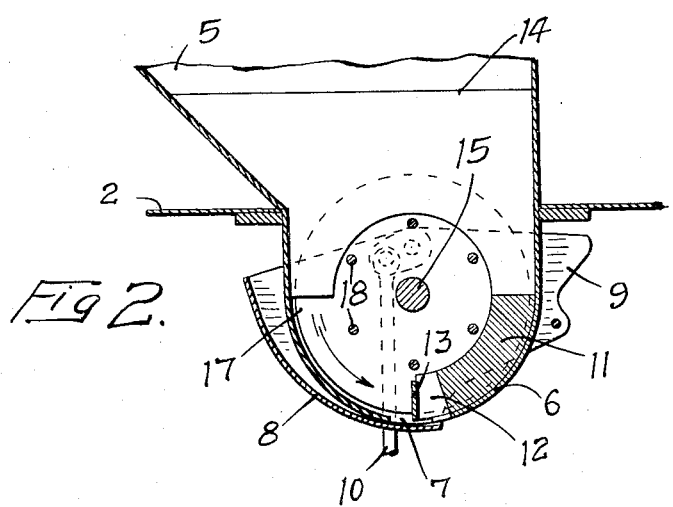

In the accompanying drawings forming part of this specification, Figure 1 is a vertical sectional view through a portion of a scale and hopper embodying my invention, showing the cut off in its open position, Fig. 2 is a detail sectional view through the hopper, showing the cut off tilted and with the main discharge opening closed thereby, Fig. 3 is a transverse sectional view, showing the means by which I provide for a positive feed from the hopper, Fig. 4 is a plan view of the hopper.

In the drawing, 2 represents the casing of the scale, 3 the scale beam, and 4 the scale pan or box into which the flour is delivered from the scale hopper 5. The bottom 6 of the hopper is curved and semi-circular, substantially, in cross section and provided with a slot or opening 7 which extends across the hopper from side to side. Through this slot or opening the flour falls from the hopper into the scale pan beneath.

8 is a curved cut off plate and 9 are end plates whereto the plate 8 is secured. The plates 9 are journaled on the casing of the scale and are connected with the scale beam 3 by a rod 10. (See Figs. 1 and 2.) The rod 10 has a crank connection, (indicated by dotted lines) with the plate 9 which, when the scale pan descends with the weight of the load, will tilt the plates 9 and swing the cut off plate across the feed opening in the bottom of the hopper and cut off the feed of flour.

To provide for a uniform or positive feed through the dribble opening, I have produced a device which I may designate as an auxiliary or supplemental hopper arranged preferably in the bottom of the main hopper and including a curved block 11 of wood, or other suitable material, located opposite the middle of the feed opening and extending partially across the same and having a longitudinal recess 12 in its edge. A plate 13 is secured to this block and bridges the recess. (See Fig. 4). The block 11 is preferably disposed between walls 14 which are secured to the inner walls of the hopper. A shaft 15 extends through the hopper and on this shaft hubs 16 are secured, having disks 17. These disks are arranged parallel with one another and are preferably connected by rods 18. These rods are provided at suitable intervals between the disks 17 in position to sweep over the inner edge of the plate 13 and in so doing sweep a small quantity of flour into the recess or dribble opening 12 formed in the block 11. The movement of the rods will be positive and uniform, and the flour cannot possibly arch or bridge, or in any way clog this dribble opening and prevent a uniform amount of flour from feeding from the hopper and through the dribble opening into the scale pan beneath.

Figs. 1 and 2 illustrate the arrangement of the feed rods in connection with the plate 13 and the dribble opening, and show how the flour will be swept by these rods over the plate 13 without any danger of clogging or arching and thereby insuring a positive and uniform feed through the dribble opening to the scale pan. The disks 17 and the rods 18 between them form, in effect, a rotating feed reel driven by their supporting shaft, which, in turn, is operated by a mechanism, not shown.

In scales of this kind as usually constructed there is a variable feed of the flour, and this lack of uniformity in the feed renders it difficult to control. If the feed is light, the flour will fall through the dribble opening in a satisfactory manner, but if a large volume of flour enters the hopper it is very apt to clog, bridge or arch over the dribble opening and cut off the feed. By providing this positive feed for the dribble opening I am able to force the flour down through it and insure a sufficient feed to balance the scale, and, furthermore, this feed will always be uniform, regardless of the quantity of flour delivered to the hopper.

In various ways the details of construction of the hopper and the manner of providing the dribble opening therein may be modified and still be within the scope of my invention.

I claim as my invention:—

1. The combination, with a feed hopper for an automatic weigher, said hopper having independent feed and dribble openings arranged in the lower part thereof, of an upright plate arranged within said hopper and separating the passages leading to said openings, and means arranged within said hopper and operating above said plate for feeding the material over said plate to said dribble opening.

2. The combination, with a feed hopper for an automatic weigher, said hopper having a feed opening and an independent dribble opening, both openings being located in the bottom of said hopper, of means arranged within said hopper causing the entrance to said dribble opening to be above the level of said feed opening, and means operating adjacent to said dribble opening for agitating the material in said hopper and positively feeding it to said dribble opening.

3. A scale comprising a feed hopper for an automatic weigher, said hopper having a feed opening and a dribble opening, an upright plate separating said openings, a cut-off device operating to close said feed opening, and means arranged within said hopper to sweep over said plate and positively deliver the material to the dribble opening.

4. A scale comprising a feed hopper for an automatic weigher, said hopper having a feed opening, a cut off plate for said opening, a scale pan operatively connected with said cut off plate, a block arranged in said hopper and having a recess therein forming a dribble opening, and a plate bridging said openings and means arranged to sweep over said plate and positively deliver a portion of the material in said hopper to said dribble opening.

5. A scale comprising a feed hopper for an automatic weigher, said hopper having a feed opening, a scale pan and a cut off plate connected therewith, said hopper having a dribble opening, a shaft extending through said hopper, disks mounted thereon, rods secured to said disks and adapted to sweep over said dribble opening and positively deliver a portion of the material in said hopper to said dribble opening.

6. A flour scale comprising a feed hopper for an automatic weigher, said hopper having a feed opening, a scale pan, a cut off plate for said opening operatively connected with said scale pan, said hopper having a dribble opening, a plate separating said dribble opening from said feed opening, and a revolving reel operating to positively feed a limited quantity of flour to said dribble opening.

7. A scale comprising a feed hopper for an automatic weigher, said hopper having a feed opening in its lower walls extending from side to side of said hopper, said hopper having a dribble opening extending partially across the same, a cut-off for said openings, an upright partition wall between said openings and means for positively feeding the material to said dribble opening.

8. A scale comprising a feed hopper for an automatic weigher, said hopper having a feed opening therein, a dribble opening extending partially across said hopper, a cut-off for said openings, an upright partition wall between said openings and a revolving reel bridging said dribble opening and operating to positively feed the material thereto.

9. A scale comprising a feed hopper for an automatic weigher, said hopper having a feed opening and an independent dribble opening, a cut-off device for said feed opening, an upright partition wall between said openings and a revolving reel bridging said dribble opening for positively delivering a portion of the material in said hopper to said dribble opening.

10. A scale comprising a feed hopper for an automatic weigher, said hopper having a feed opening and a cut-off plate, a scale-pan operatively connected with said cut-off plate, said hopper having a dribble opening adjacent to the feed opening, a wall arranged within the hopper and separating said openings, and a feed reel operating within said hopper to agitate the material above said opening and deliver a limited quantity to said dribble opening.

11. The combination of a supply hopper, a feeder rotatable therein and embodying axially spaced members, the feeder and hopper coöperating to form feed compartments, bars connecting said members, and means for reducing the feed from one of said compartments to a dribble stream and for cutting off the feed from the other compartments of the feeder.

12. The combination of a supply hopper, a feeder rotatable therein and embodying spaced heads forming, with the hopper, feed compartments, one between and the other at the opposite sides of the heads, and circumferentially spaced members extending in substantially the direction of the axis of the feeder and connecting the heads for the compartments therebetween and coöperative with portions of the interior of the hopper, and means for reducing the feed from the compartment between said heads to a dribble stream and for cutting off the feed from the other compartments of the feeder.

13. The combination of a supply hopper, a feeder rotatable therein and embodying axially spaced heads forming with the hopper separate feed compartments, spaced members extending between and connecting the heads, and means for reducing the feed from one of said compartments to a dribble stream and for cutting off the feed from the other compartments.

14. The combination of a supply hopper having an outlet, a feeder rotatable in the hopper adjacent to said outlet and embodying spaced heads forming, with the hopper, feed compartments, and a set of circumferentially spaced members extending in substantially the direction of the axis of the feeder and rotatable therewith so as to be movable past said outlet, and a gate for said outlet operative to cut off the feed through all but one of said compartments and to reduce the feed from said one of said compartments to a dribble stream.

15. The combination of a supply hopper having an outlet, a feeder movable in the hopper and embodying spaced heads forming, with the hopper, feed compartments, and rods connecting the heads and operative past said outlet, and means for forming a dribble flow from one of said compartments and for cutting off the flow from the other compartments.

16. The combination of a supply hopper having an outlet, a feeder revoluble therein and embodying axially spaced heads forming a chamber between them, a set of circumferentially spaced members arranged in said chamber and connected to said heads, and a raised portion in the hopper projecting into said chamber and coöperative with said members.

17. The combination of a supply hopper having an outlet, and an abutment adjacent thereto, and a feeder revoluble in the hopper and embodying disks operative at opposite sides of said abutment, and circumferentially spaced members fixed to and arranged between the disks and rotatable across the outlet and past said abutment.

18. The combination of a supply hopper having an outlet and a raised bottom section forming a sloping wall adjacent to said outlet, and a feeder revoluble in the hopper and embodying a set of circumferentially spaced rods movable across the outlet and past said wall in immediate proximity to said raised bottom section.

19. The combination of a supply hopper having an outlet and a raised bottom section forming a wall adjacent to one edge of said outlet, a plate arranged adjacent to said wall and having a dribble feeding passage, and a feeder operative in the hopper past said plate and wall.

In witness whereof, I have hereunto set my hand this 13" day of July, 1912.

CHARLES H. SCOTT.

Witnesses:
GENEVIEVE E. SORENSEN,
EDWARD A. PAUL.

Copies of this patent may be obtained for five cents each, by addressing the "Commissioner of Patents, Washington, D. C."